3,489,528
PREPARATION OF POLYAMINOBORANES
William E. Zanieski, Pittsburgh, Pa., assignor to Mine Safety Appliances Company, a corporation of Pennsylvania
No Drawing. Filed Apr. 5, 1965, Ser. No. 445,707
Int. Cl. C01b 21/00
U.S. Cl. 23—358
6 Claims

ABSTRACT OF THE DISCLOSURE

Ammonia and diborane are reacted in tetrahydrofuran at a temperature below about −30° C.; polyaminoboranes are precipitated when the reaction mixture is warmed. Aging of an ammonia solution of the polyaminoboranes so produced yields an ammonia insoluble, more highly polymerized polyaminoborane.

---

This invention relates to a method of preparing boron-nitrogen polymers, and more particularly polyaminoboranes having a plurality of $BH_2NH_2$ groups.

Polyaminoborane $(BH_2NH_2)_n$ have been identified as minor or by-products of the decomposition of various boron-nitrogen compounds. Polyaminoboranes have also been prepared (Shore et al., Preparation and Identification of New $BH_2NH_2$ Species, paper presented at 148th ACS Meeting, Chicago, 1964) by the reaction of diborane diammoniate and an alkali metal amide in liquid ammonia. In this and other methods involving the reaction alkali metals and alkali metal compounds, a large portion of the original diborane is lost by the production of by-product alkali metal borohydride. Also, reactions of diborane in liquid ammonia are notoriously sensitive to condition and techniques, so they are difficult to reproduce and scale up to commercial operations from laboratory operations is unreliable.

It is an object of this invention to provide a simple, economical and reliable method of preparing polyaminoborane directly from ammonia $(NH_3)$ and diborane $(B_2H_6)$. Other objects will be apparent from the following description and claims.

In accordance with this invention, diborane and ammonia are introduced at a temperature below about −30° C. into tetrahydrofuran (THF) and the resulting mixture is permitted to warm to a temperature above about −30° C. whereby hydrogen is evolved and solid polyaminoborane precipitates from the reaction mixture. The polyaminoborane product so obtained may be dissolved in liquid ammonia from which solution a more highly polymerized polyaminoborane precipitates.

Exemplifying the invention, 10.0 g. of gaseous diborane was bubbled into 250 ml. of THF at −78° C. to form a solution of tetrahydrofuran-borane adduct $(THF \cdot BH_3)$ in tetrahydrofuran. 11.8 g. of ammonia was condensed into the solution and the mixture was held at −78° C. overnight, during which time a solid material had formed in the reaction mixture. The reaction mixture was then allowed to warm and the solid material dissolved at a temperature of about −40 to −30° C. On further warming hydrogen was evolved at about −10° C. and polyaminoborane was precipitated from the resultant clear solution on standing for about 2 hours or less at room temperature. The polyaminoboranes were filtered from the reaction liquor, washed with tetrahydrofuran, and vacuum dried. The product is a polyaminoborane having terminal ammonia and borane groups of the formula $NH_3(BH_2NH_2)_nBH_3$. It has not been precisely determined whether the product is a single compound or a mixture of compounds having a different number of $(BH_2NH_2)$ groups, but the product is consistent in composition, as shown by infra-red and elemental analyses, and the average value of $n$ is about 4.

In another example a solution of $THF \cdot BH_3$ containing 2.99 g. of $B_2H_6$ in 150 ml. of THF was prepared in the same manner as the previous example and the solution was warmed to −30° C. 3.12 g. of gaseous ammonia was bubbled into and dissolved in the solution at −30° C. and the resultant clear solution was warmed to 0° C., at which temperature hydrogen was evolved and polyaminoborane, identical to that obtained in the previous example, precipitated from the reaction mixture.

Although the invention is not limited to any particular reaction mechanism, it appears that the reaction of $NH_3$ and $B_2H_6$ in THF forms an intermediate that is formed and is stable only at temperatures below about −30° C. and that this intermediate decomposes at temperatures above about −30° C. with the evolution of hydrogen to form polyaminoboranes. The second reaction step may be accomplished at any temperature above about −30° C. and below the boiling point of tetrahydrofuran, but room temperature is preferred as it is easily obtained and the reaction rate is reasonably fast.

It is preferred to use about stoichiometric quantities of reactants, that is 2 mols of ammonia for each mol of diborane, since there is no apparent advantage in using other proportions and yields are optimized, typically over 90% yield. If more than about a 15% excess of diborane is used the yield of polyaminoborane is drastically reduced, the major product being ammonia borane which is soluble in tetrahydrofuran.

Liquid ammonia dissolves and reacts with

$$NH_3(BH_2NH_2)_nBH_3$$

to remove the terminal $BH_3$ and $NH_3$ groups forming ammonia borane and an ammonia insoluble polyaminoborane made up of a plurality of $BH_2NH_2$ groups and having the empirical formula $BNH_4$. Illustrative of the reaction, 40 ml. of ammonia was condensed at −78° C. onto 3.5 grams of $NH_3(BH_2NH_2)_nBH_3$ prepared in accordance with the foregoing examples in a Fischer-Porter tube. The resultant slurry was warmed and the solids dissolved forming a solution below about 0° C. On storage of the solution between 0° C. and room temperature for several hours, a white precipitate formed. The ammonia was removed and the solid residue was washed with ethyl ether and tetrahydrofuran and vacuum dried, yielding a 92.6% recovery of polyaminoborane having the empirical formula $BNH_4$ as determined by elemental analysis. This product is very similar to $(BH_2NH_2)_5$ reported by Shore et al. in its properties, but there are some differences in the X-ray and infra-red patterns which show it is not identical to $(BH_2NH_2)_5$. The temperature of the reaction is not critical, but it is preferred to use a temperature above about 0° C., conveniently room temperature, to obtain reasonably fast reaction rates.

Both $NH_3(NH_2BH_2)_nBH_3$ and the polyaminoborane obtained from reaction of this material with ammonia, sublime, with decomposition, at about 150° C. to give identical $(BH_2NH_2)_n$ sublimates. I have found, however, that when the materials are compressed, as by compressing into a pellet at 25,000 p.s.i.g., to a coherent compact, that they decompose upon heating without subliming, giving hydrogen and leaving a boron nitride residue. Such compacts are therefore useful as a convenient hydrogen source, especially in field use, as for balloon filling. The $NH_3(NH_2BH_2)_nBH_3$ yields more hydrogen on weight basis, and the polyaminoborane from the ammonia reaction yields more hydrogen on a volume basis, as its density is 1.05 as compared to a density of 0.93 for $NH_3(NH_2BH_2)_nBH_3$. The thermal decomposition of the polyaminoboranes is also a convenient method for producing refractory boron nitrides. The polyaminoboranes made by the methods of this invention are particularly suited for use as ablative coating, e.g. they slowly decompose when subjected to a flame, absorbing heat and leaving a desirable boron nitride residue.

According to the provisions of the patent statutes, I have explained the principle and mode of practicing my invention and have described what I now consider to be its best embodiments. However, I desire to have it understood that, within the scope of the appended claims, the invention may be practiced otherwise than as specifically described.

I claim:

1. A method of producing polyaminoboranes comprising contacting ammonia and diborane in tetrahydrofuran at a temperature below about −30° C. in the proportions of about 2 mols of ammonia for each mol of diborane, warming the reaction mixture to a temperature above about −30° C. to precipitate polyaminoboranes, and recovering said polyaminoboranes.

2. A method according to claim 1 in which the reaction mixture is warmed to room temperature.

3. A method of producing polyaminoboranes comprising absorbing diborane in tetrahydrofuran at a temperature below about −30° C., introducing about 2 mols of ammonia for each mol of diborane into said diborane solution, warming the resultant solution until gas is evolved therefrom, and recovering the polyaminoboranes precipitated thereby.

4. A method of producing polyaminoboranes consisting essentially of a plurality of $BH_2NH_2$ groups comprising contacting ammonia and diborane in tetrahydrofuran at a temperature below about −30° C. in the proportions of about 2 mols of ammonia for each mol of diborane, warming the reaction mixture to a temperature above about −30° C. to form a first precipitate of polyaminoboranes, separating said first precipitate, dissolving said first precipitate in liquid ammonia, aging said solution until a second precipitate forms and recovering said second precipitate.

5. A method according to claim 4 in which the ammonia solution is aged at between about 0° C. and room temperature.

6. A method according to claim 4 in which the first precipitate is dissolved in liquid ammonia at a temperature below about 0° C.

References Cited

UNITED STATES PATENTS

| | | | |
|---|---|---|---|
| 3,022,138 | 2/1962 | Clark et al. | 23—204 |
| 3,159,451 | 12/1964 | Gunderloy | 23—358 |

OTHER REFERENCES

Schaeffer, George W., et al., "Journal of the American Chemical Society," vol. 78, pp. 725–728; 1956.

Egan, B. Z., et al., "Journal of the American Chemical Society," vol. 83, pp. 4718–19, 1961.

OSCAR R. VERTIZ, Primary Examiner

G. O. PETERS, Assistant Examiner